(12) United States Patent
Yoon

(10) Patent No.: US 7,240,456 B2
(45) Date of Patent: Jul. 10, 2007

(54) CONTAINER FOR LIQUID PLANT NUTRIENTS

(76) Inventor: Sang Hwa Yoon, 1-301 Woosung Jootaek, 692-2 Hakik-dong, Nam-gu, Incheon-shi 402-040 (KR)

( * ) Notice: Subject to any disclaimer, the term of this patent is extended or adjusted under 35 U.S.C. 154(b) by 0 days.

(21) Appl. No.: 10/885,413

(22) Filed: Jul. 7, 2004

(65) Prior Publication Data

US 2005/0005515 A1 Jan. 13, 2005

(30) Foreign Application Priority Data

Jul. 7, 2003 (KR) .................. 20-2003-0021720

(51) Int. Cl.
*A01G 29/00* (2006.01)
(52) U.S. Cl. ....................................... 47/48.5
(58) Field of Classification Search ............... 47/48.5, 47/79; 222/129, 149, 150, 151, 153.05, 420, 222/541.5, 464.1; 206/219, 221
See application file for complete search history.

(56) References Cited

U.S. PATENT DOCUMENTS 3,416,712 A * 12/1968 Shastal .................. 222/541.5
4,408,699 A * 10/1983 Stock ..................... 222/149
5,568,701 A * 10/1996 Haigler ................... 47/48.5
5,908,107 A * 6/1999 Baudin .................. 206/221
6,543,645 B2 * 4/2003 Lacout ................... 222/129
6,655,524 B2 * 12/2003 De Laforcade ........... 206/222

FOREIGN PATENT DOCUMENTS

JP          01099969 A   *   4/1989

* cited by examiner

*Primary Examiner*—Francis T. Palo

(57) ABSTRACT

Disclosed herein is a container for liquid plant nutrients. The container includes a bottle and a cap. The cap includes an outer sealing skirt, an inner sealing protrusion, a head, and a neck. The outer sealing skirt is formed in a cylindrical shape closed at the top thereof. The inner sealing protrusion is projected from the bottom of the inside of the outer sealing skirt. The head is projected from the outer sealing skirt to be easily gripped with the fingers. The neck connects the head and the top of the outer sealing skirt, is of a width smaller than that of the head, and has a discharge hole extended from the bottom of the inner sealing protrusion to the top of the neck.

8 Claims, 8 Drawing Sheets

CONTAINER FOR LIQUID PLANT NUTRIENTS

BACKGROUND OF THE INVENTION

1. Field of the Invention

The present invention relates, in general, to a container for liquid plant nutrients and, more particularly, to a container for liquid plant nutrients, which is stuck into a flowerpot and then used to feed nutrients to a plant.

2. Description of the Related Art

Generally, nutrients (or remedial agents) for plants are manufactured in liquid form and then contained in synthetic resin containers. Such an agent is fed into the soil around a plant when the plant withers due to the lack of nutrition, after or before the plant flowers, when sunlight is insufficient, or when the prevention of damage from disease and harmful insects is required. Liquid plant nutrients are accommodated in a container that has a long, slender mouth so that the container can be stuck into a flowerpot in an upside-down position. An example of such a container is illustrated in FIGS. 1 and 2. FIG. 1 is a perspective view showing a conventional cap of a conventional container for liquid plant nutrients. FIG. 2 is a sectional view showing the cap of FIG. 1 combined with a conventional bottle. The cap 2 is made of highly elastic, soft synthetic resin. The inner diameter of the cap 2 is made to be slightly smaller than or equal to the outer diameter of the entrance of the mouth 11 of the bottle, so that the cap 2 can be put on the mouth 11 of the bottle in such a way that the inner surface of the cap 2 is pressed on and brought into tight contact with the outer surface of the mouth 11. The tip 3 of the cap 2 is long and pointed, and is provided with a discharge hole. A user uses the container after cutting off the tip 3 of the cap 2 using scissors or a knife. Accordingly, a separate cutting tool is required to open the container.

Such snap caps to be put on the mouths of the bottle in a snap manner have been widely used because they can considerably reduce working time during a bottling process compared to screw caps. The conventional snap cap 2 is brought into tight contact with the entrance of the mouth 11 in an initial stage. However, when the cap 2 is expanded or the entrance of the mouth 11 of the container is contracted during the conveyance or storage of the container, a gap is produced between the inner surface of the cap 2 and the outer surface of the mouth 11. Furthermore, when external pressure is incidentally applied to the outer surface of the cap 2, a gap is also produced between the inner surface of the cap 2 and the outer surface of the mouth 11 if the cap 2 or mouth 11 are immediately restored to the original shapes thereof. When the gap is produced between the inner surface of the cap 2 and the outer surface of the mouth 11, a problem arises in that liquid nutrients filling the container are naturally evaporated or the cap 2 itself is removed from the mouth 11.

SUMMARY OF THE INVENTION

Accordingly, the present invention has been made keeping in mind the above problems occurring in the prior art, and an object of the present invention is to provide a container for liquid plant nutrients, which can be used after being opened by the fingers without a separate cutting tool.

Another object of the present invention is to provide a container for liquid plant nutrients, which is capable of keeping the cap and mouth thereof airtight regardless of the variations of external temperature and the application of external pressure.

In order to accomplish the above object, the present invention provides a container for liquid plant nutrients, including a bottle for accommodating liquid plant nutrients; and a cap fastened to the bottle by being pressed on the entrance of the mouth of the bottle, the cap including an outer sealing skirt formed in a cylindrical shape closed at the top thereof, so that the inside surface of the outer sealing skirt comes into tight contact with the outer surface of the mouth of the bottle when the cap is fastened to the bottle; an inner sealing protrusion projected from the bottom of the inside of the outer sealing skirt, so that the outer surface of the inner sealing protrusion comes into tight contact with the inside surface of the entrance of the mouth when the cap is fastened to the bottle; a head projected from the outer sealing skirt to be easily gripped with the fingers; and a neck connecting the head and the top of the outer sealing skirt, being of a width smaller than that of the head, and having a discharge hole extended from the bottom of the inner sealing protrusion to the top of the neck so as to allow the inside of the bottle to communicate with the outside of the bottle when the neck is removed.

The cap may be made of soft synthetic resin, so that the neck can be easily removed by twisting the head.

The head may be formed to have a polygonal cross section, so that the head can be easily gripped by the fingers.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENT

Figure 1:
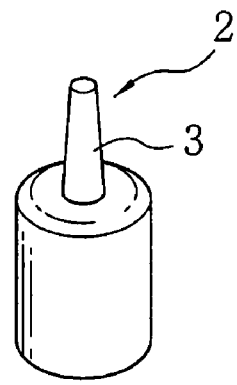
FIG. 1 is a perspective view showing the conventional cap of a conventional container for liquid plant nutrients.
Figure 2:
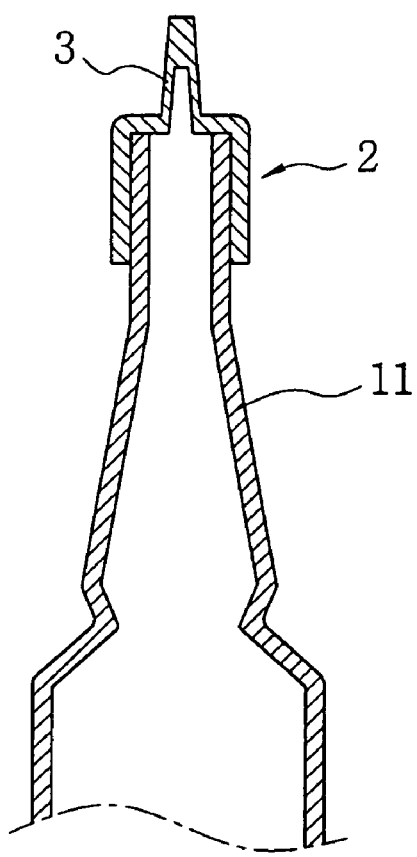
FIG. 2 is a sectional view showing the cap of FIG. 1 combined with a conventional bottle.

Reference should now be made to the drawings, in which the same reference numerals are used throughout the different drawings to designate the same or similar components.

Figure 3:
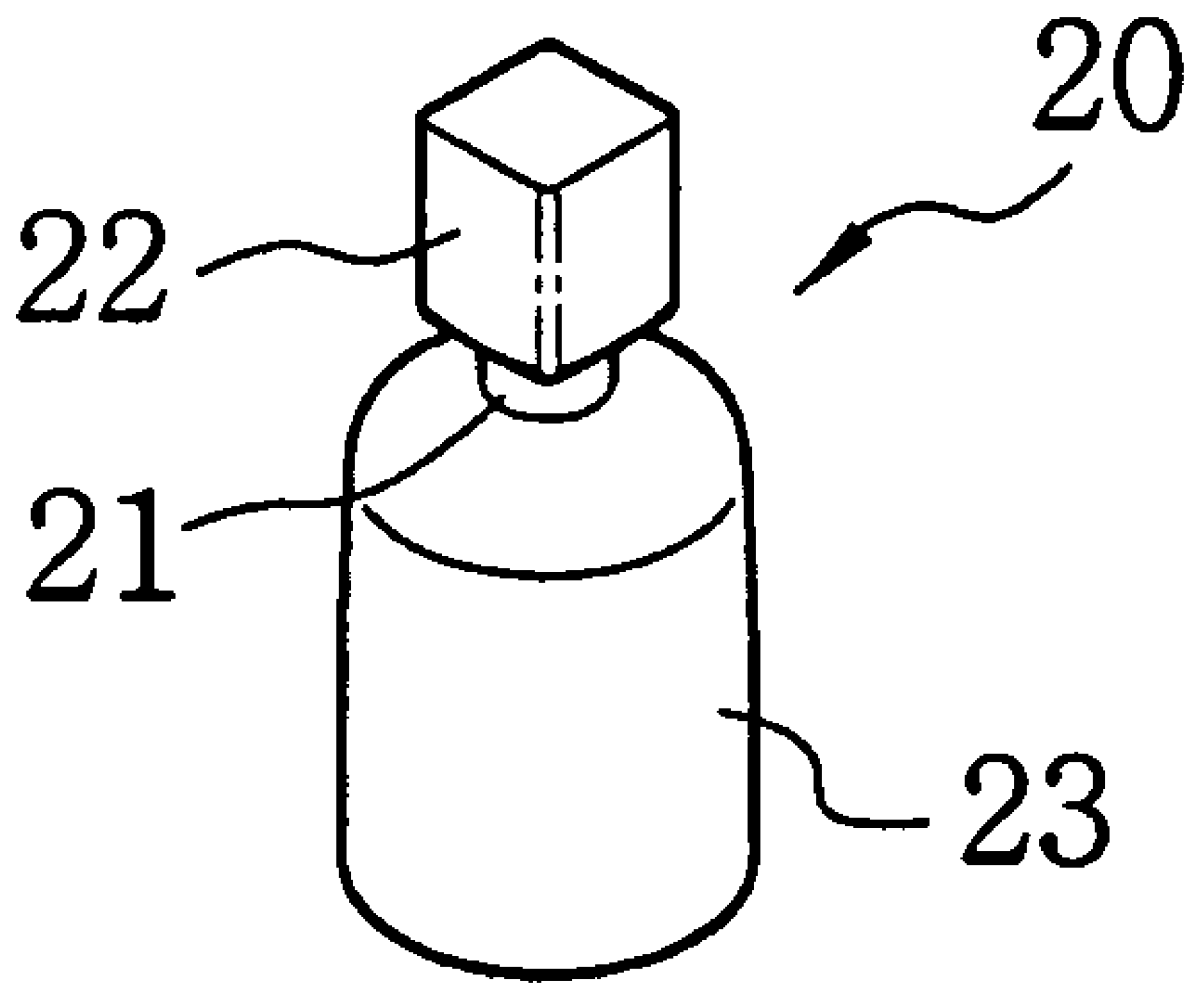
FIG. 3 is a perspective view showing the cap of a container for supplying nutrients in accordance with the present invention.
Figure 4:
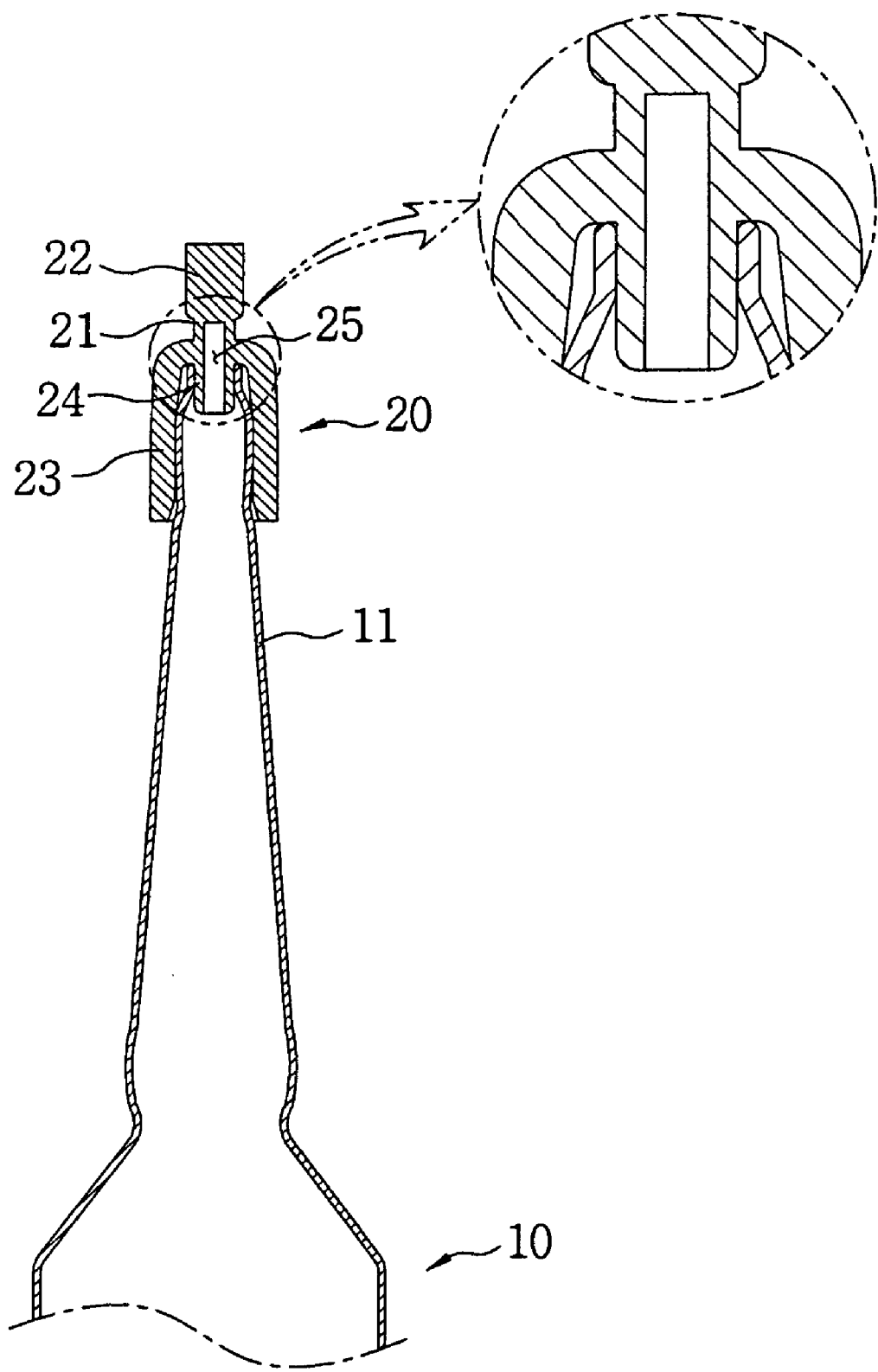
FIG. 4 is a sectional view showing the cap of FIG. 3 combined with a bottle in accordance with the present invention.

FIG. 3 is a perspective view showing the cap of a container for supplying nutrients in accordance with the present invention. FIG. 4 is a sectional view showing the cap of FIG. 3 combined with a bottle.

Referring to FIGS. 3 and 4, the cap 20 of the present invention is characterized by a head 22 that can be gripped and twisted by the fingers of a user, and a neck 21 that connects the head 22 to an outer sealing skirt 23 and is provided with a discharge hole 25. Since the neck 21 is small in outer diameter and is provided with the discharge hole 25, the neck 21 can be easily removed by gripping and twisting the head 22 with the thumb and the index finger. As shown in FIG. 3, the head 22 of the cap 20 may be constructed in square pillar form. However, the shape of the head 22 is not limited to the square pillar form, but may be constructed in any form that can be easily gripped and twisted by the fingers. The cross section of the head 22 is preferably constructed in polygonal form because a polygonal section allows the user to easily grip the head 22.

Referring to FIG. 4, the present invention is characterized in that the cap 20 is combined with the mouth 11 of a bottle 10 through the outer sealing skirt 23 and an inner sealing protrusion 24 in a double sealing manner. The outer sealing skirt 23 is brought into tight contact with the outer surface of the mouth 11 at the inner surface thereof, and the inner sealing protrusion 24 is projected from the top of the inner surface of the outer sealing skirt 23 in rod form and is inserted into the mouth 11 and brought into tight contact with the inner surface of the mouth 11. The bottle 10 may be made of hard synthetic resin, and the cap 20 put on the bottle 10 may be made of soft synthetic resin to improve the airtight property thereof. The cap 20 may be made of synthetic rubber. Accordingly, in most cases, the rates of expansion and contraction of the cap 20 are higher than those of the mouth 11 of the bottle 10. As a result, when the cap 20 and the mouth 11 are expanded at different rates of expansion according to an increase in external temperature or the cap 20 and the mouth 11 are contracted at different rates of contraction according to a decrease in external temperature, sealing can be always achieved on one of the outer and inner surfaces of the entrance of the mouth 11.

The discharge hole 25 is extended from the bottom of the inner sealing protrusion 24 to the top of the neck 21, thus reaching the upper portion of the inside of the mouth 11 when the cap 20 is put on the mouth 11 of the bottle 10. When the head 22 is removed at the neck 22 of the cap 20, the inside of the bottle 10 can communicate with the outside of the bottle 10, so nutrients accommodated in the bottle 10 can flow out of the bottle 10. The neck 21 forms a tube with a certain length by the provision of the discharge hole 25. The diameter of the discharge hole 25 is determined in view of the time for which liquid plant nutrients are desirably discharged from the bottle 10.

Figure 5:
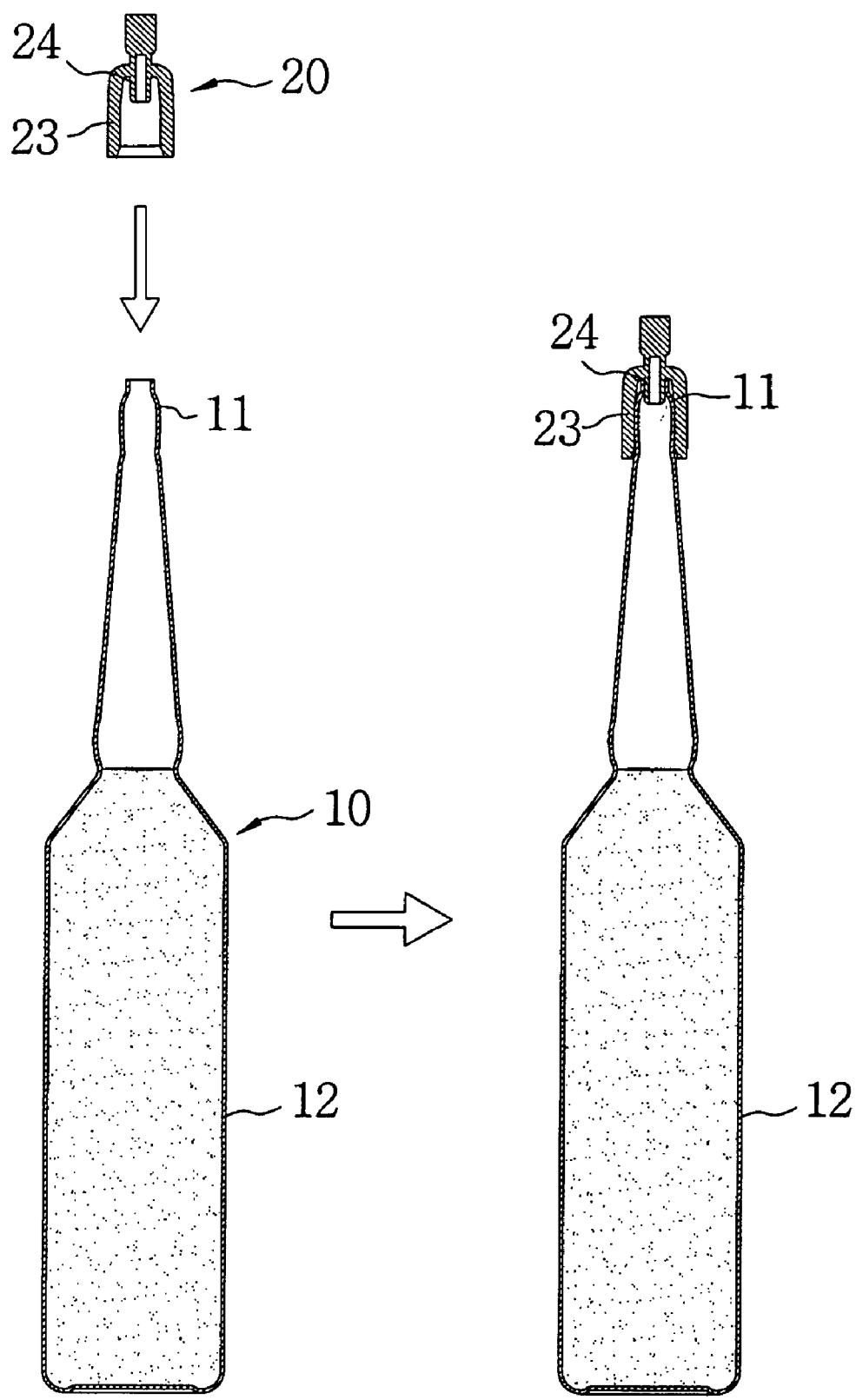
FIG. 5 is a sectional view showing a method of bottling liquid plant nutrients using the container for liquid plant nutrients.
Figure 6:
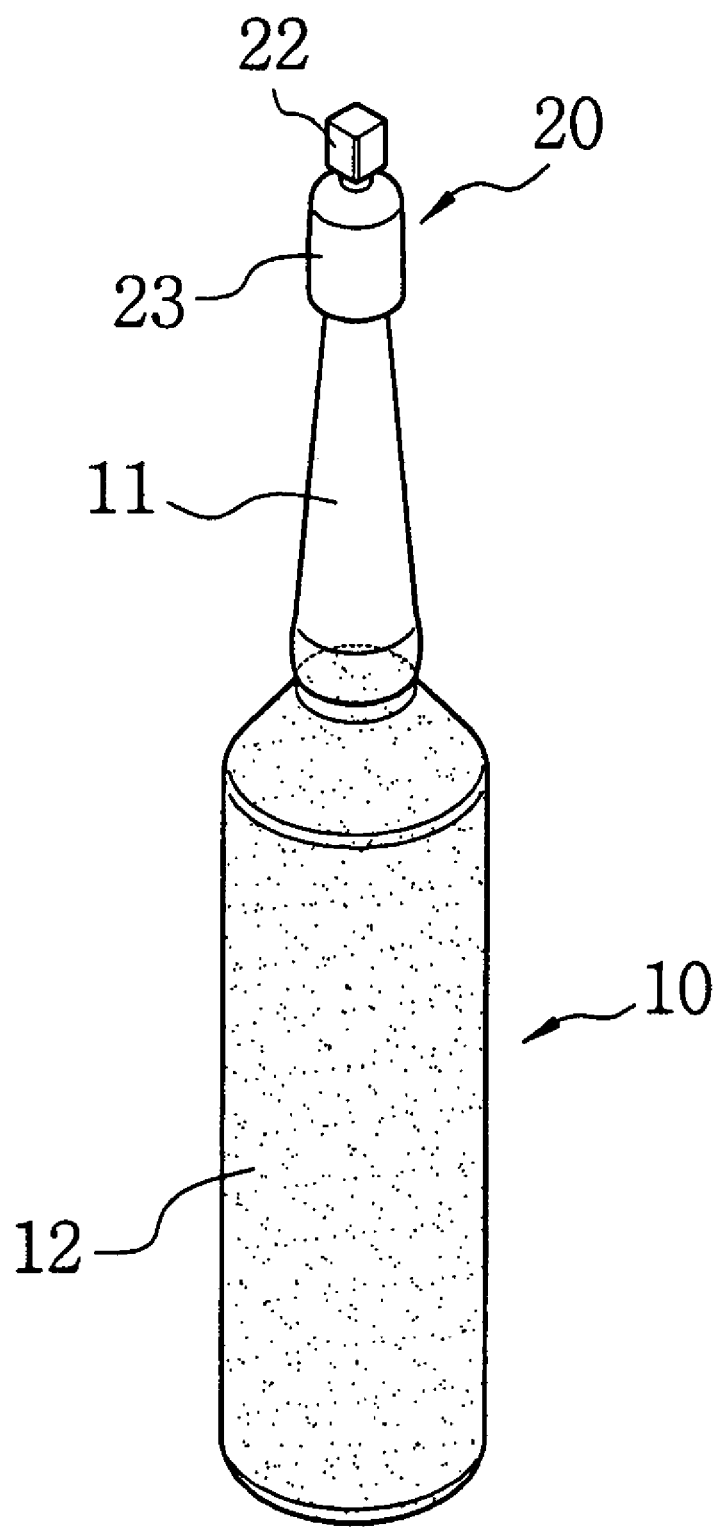
FIG. 6 is a perspective view showing the container that accommodates liquid plant nutrients in accordance with the method of FIG. 5.
Figure 7A:
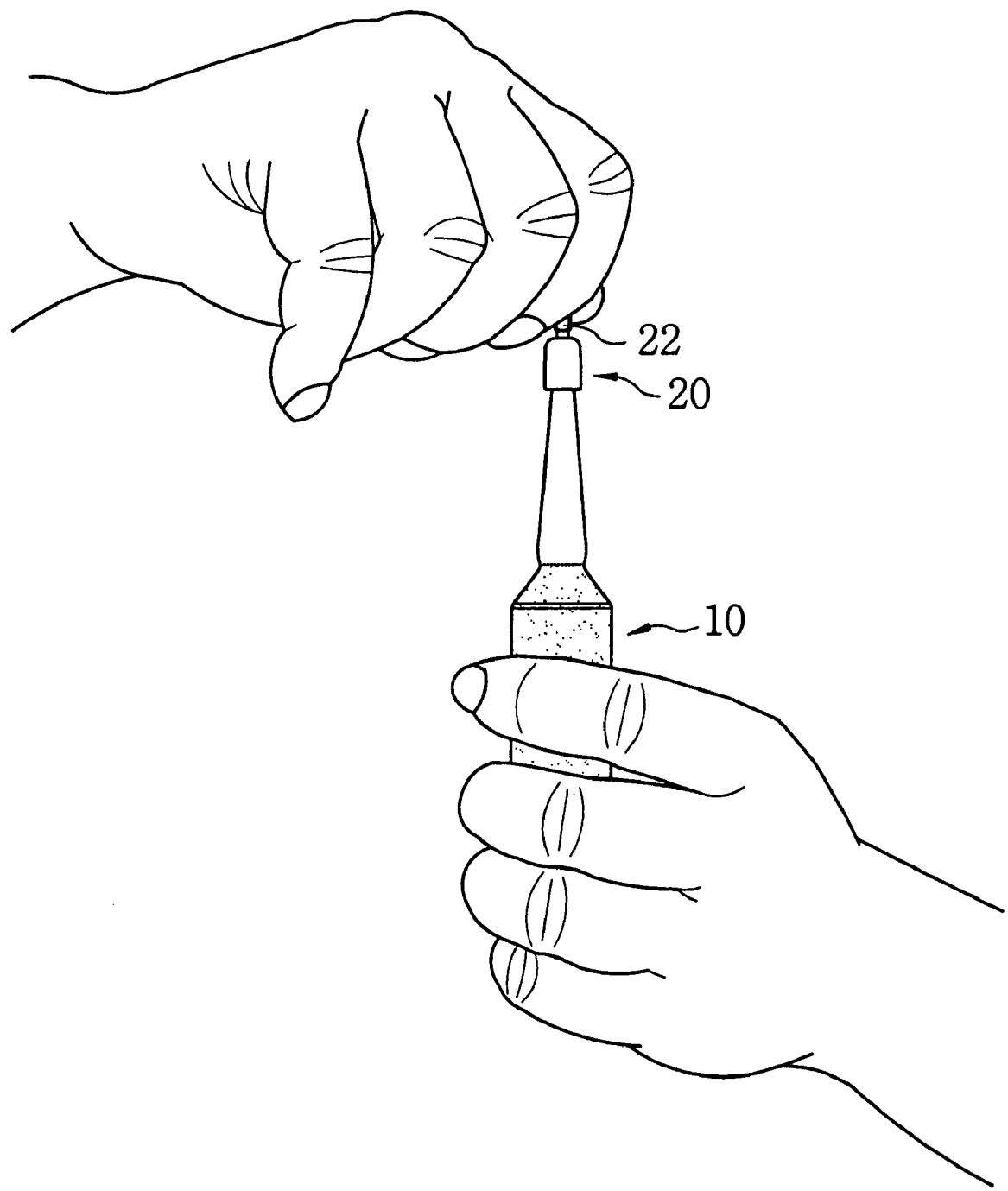
FIGS. 7a to 7c are views showing the use of the container for liquid plant nutrients in accordance with the present invention.
Figure 7B:
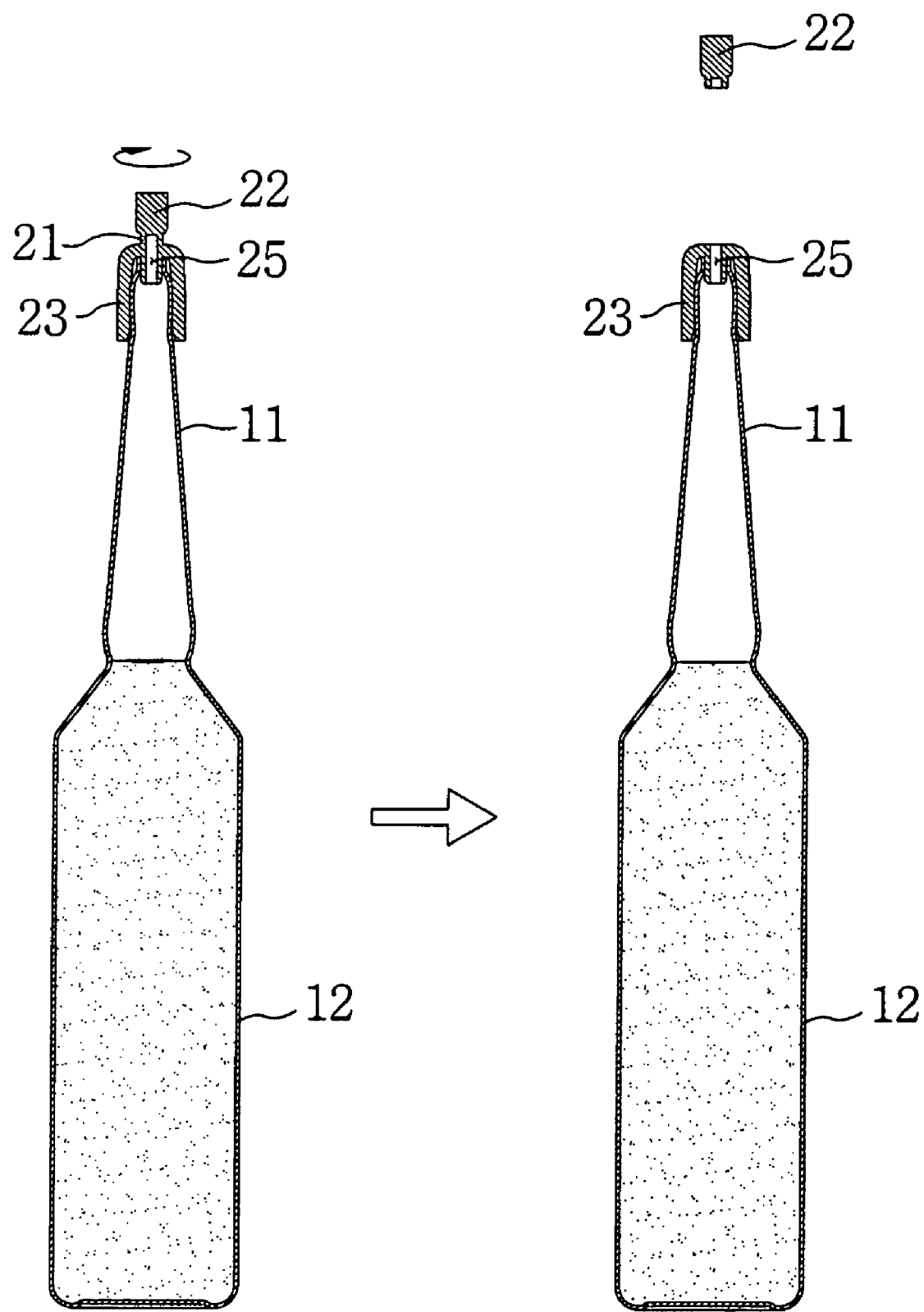
Figure 7C:
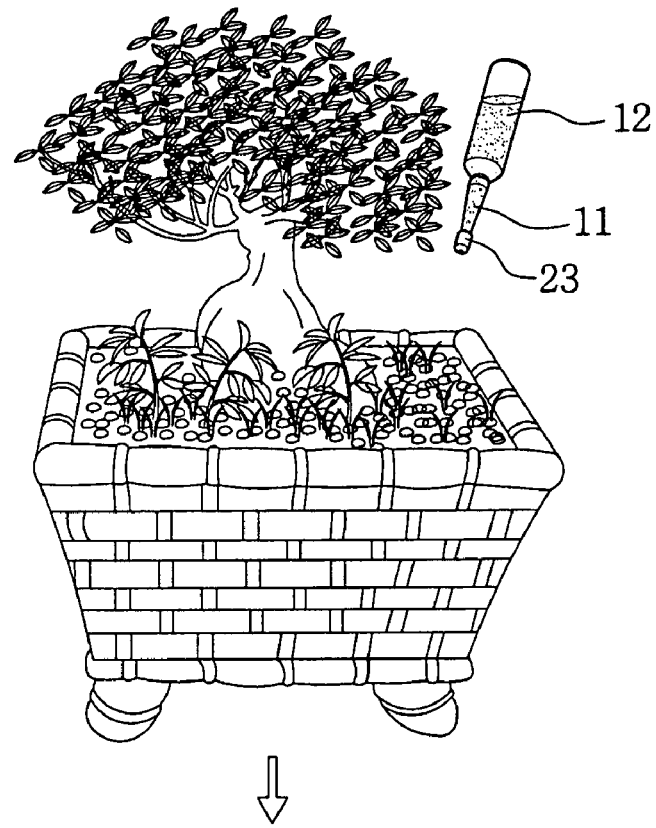
Figure 7C:
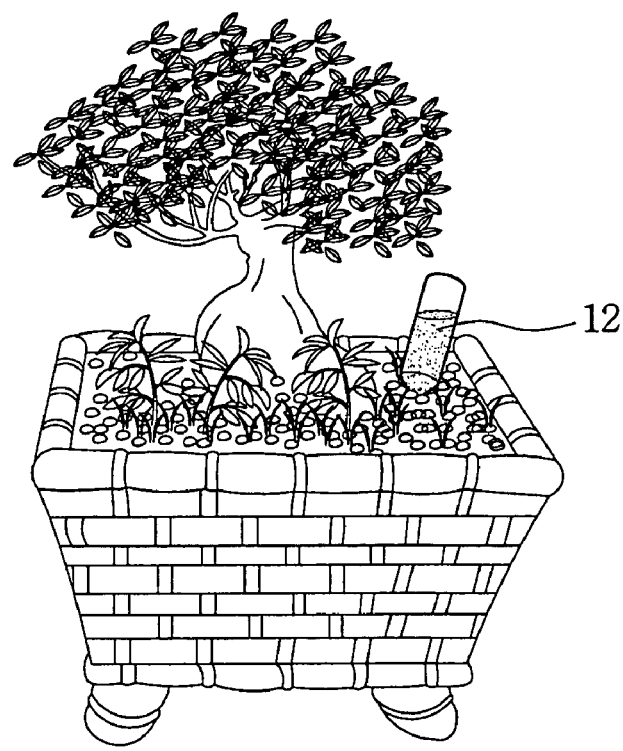

FIG. 5 is a sectional view showing a method of bottling liquid plant nutrients using a container for liquid plant nutrients. FIG. 6 is a perspective view showing the container that accommodates liquid plant nutrients in accordance with the method of FIG. 5. FIGS. 7a to 7c are views showing the use of the container for liquid plant nutrients in accordance with the present invention.

Referring to FIG. 5, after the bottle 10 is filled with liquid plant nutrients, the cap 20 is pressed on and fastened to the entrance of the mouth 11 of the body 12 of the bottle 10. Since sealing is simultaneously achieved between the inner surface of the outer sealing skirt 23 and the outer surface of the mouth 11 and between the outer surface of the inner sealing protrusion 24 and the inner surface of the entrance of the mouth 11 through a single pressing operation, complete sealing can be achieved within a short operation time.

As shown in FIG. 6, the bottle 10 filled with liquid plant nutrients and covered with the cap 20 is preferably formed to be slender and long so that the bottle 10 can be inserted into the soil. Furthermore, the body 12 of the bottle 10 is preferably constructed in a cylindrical shape having a diameter larger than that of the mouth 11.

Referring to FIG. 7a, before feeding liquid plant nutrients to a plant, the user grips and twists the head 22 with one hand while holding the body 12 of the bottle 10 with the other hand. By this, the neck 21 of the soft cap 20 is removed and the head 22 is removed from the outer sealing skirt 23 and the inner sealing projection 24. Then, the outer sealing skirt 23 and inner sealing projection 24 of the cap 20 are kept fastened to the entrance of the mouth 11 of the container and the inside of the bottle 10 is made to communicate with the outside of the container through the discharge hole 25, so that the liquid plant nutrients can flow out of the container.

Referring to FIG. 7c, by inserting the container, removed as described above, into the soil near a plant in a flowerpot, the liquid plant nutrients can be supplied to the plant.

As described above, the present invention provides the container for liquid plant nutrients, which is provided with the cap having the head capable of being easily removed from the cap by the hand, so that the container of the present invention does not require any tool during use, thus being convenient for use. Furthermore, the present invention provides the container for liquid plant nutrients, which enhances tight contact between the entrance of the mouth and the cap through the inner sealing shirt, thus minimizing the amount of evaporation regardless of the variations of temperature and long-term storage.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A container for liquid plant nutrients, comprising:
   a bottle for accommodating liquid plant nutrients; and
   a sealing unit fastened to the bottle by being pressed on an entrance of a mouth of the bottle, the mouth of the bottle comprising a first portion being the entrance and being substantially vertical and having a first inside diameter, a second portion being substantially vertical and having a second inside diameter larger than the first diameter, and a sloped portion between the first and second portions having a variable diameter, the sealing unit comprising:
   an outer sealing skirt formed in a cylindrical shape closed at a top thereof, so that an inside surface of the outer sealing skirt comes into tight contact with an outer surface of the second portion of the mouth of the bottle when the sealing unit is fastened to the bottle;
   an inner sealing protrusion projected from a top of an inside of the outer sealing skirt, so that an outer surface of the inner sealing protrusion comes into tight contact with an inside surface of the entrance of the mouth when the sealing unit is fastened to the bottle;
   a head projected from the outer sealing skirt to be easily gripped with fingers; and
   a neck connecting the head and a top of the outer sealing skirt, being of a width smaller than that of the head, and having a discharge hole extended from a bottom of the inner sealing protrusion to a top of the neck so as to allow an inside of the bottle to communicate with an outside of the bottle when the neck is removed.

2. The container according to claim 1, wherein the sealing unit is made of soft synthetic resin, so that the neck can be easily removed by twisting the head.

3. The container according to claim 1, wherein the head is formed to have a polygonal cross section, so that the head can be easily gripped by the fingers.

4. The container according to claim 2, wherein the head is formed to have a polygonal cross section, so that the head can be easily gripped by the fingers.

5. A container, comprising:
   a bottle comprising a mouth, the mouth of the bottle comprising a first portion being the entrance and being substantially vertical and having a first inside diameter, a second portion being substantially vertical and having a second inside diameter larger than the first diameter, and a sloped portion between the first and second portions having a variable diameter; and
   a sealing unit, comprising:
       an outer sealing skirt closed at a top thereof comprising an inside surface in tight contact with an outer surface of the second portion of the mouth of the bottle, and
       an inner protrusion projected from the inside surface of the outer sealing skirt comprising an outer surface in contact with an inside surface of the bottle,
   the inside surface of the outer sealing skirt and the outer surface of the bottle being substantially smooth without grooves or projections at the point of contact therebetween.

6. The container according to claim 5, wherein the sealing unit has a higher rate of expansion than the bottle.

7. The container according to claim 5, wherein the bottle accommodates liquid plant nutrients.

8. The container according to claim 5, wherein the sealing unit is a stopper.

* * * * *